United States Patent [19]

Apicella, Jr. et al.

[11] 4,010,354

[45] Mar. 1, 1977

[54] METHOD AND APPARATUS FOR TIRE IDENTIFICATION

[75] Inventors: Anthony M. Apicella, Jr., Massillon; Melvin H. Davis, Northfield Center; Aurel V. Stan, North Canton, all of Ohio

[73] Assignee: The Goodyear Tire & Rubber Company, Akron, Ohio

[22] Filed: Mar. 28, 1975

[21] Appl. No.: 563,266

[52] U.S. Cl. .................. 235/61.6 R; 152/330 R; 360/1; 235/61.12 M; 235/61.11 D; 340/149 A

[51] Int. Cl.² ................ G06K 7/08; G06K 19/06; G11B 5/00

[58] Field of Search .............. 235/61.7 R, 61.11 D, 235/61.11 E, 61.11 R, 61.12 M, 61.12 R, 61.12 N, 61.11 A, 61.7 B; 340/146.3 R, 149 A, 146.35 Y; 152/330, 361; 346/42; 164/115; 360/1, 2

[56] References Cited

UNITED STATES PATENTS

| | | | |
|---|---|---|---|
| 2,275,396 | 3/1942 | Johnson | 164/115 |
| 3,419,881 | 12/1968 | Yamamoto | 346/42 |
| 3,553,440 | 1/1971 | Dale | 235/61.12 M |
| 3,562,497 | 2/1971 | Gastal | 235/61.11 A |
| 3,609,306 | 9/1971 | Langley | 235/61.11 E |
| 3,612,835 | 10/1971 | Andrews | 235/61.11 D |
| 3,644,716 | 2/1972 | Nagata | 235/61.12 M |
| 3,711,683 | 1/1973 | Hamisch | 235/61.12 N |
| 3,735,350 | 5/1973 | Lemelson | 340/146.3 SY |
| 3,746,606 | 7/1973 | Chao | 235/61.12 M |
| 3,781,798 | 12/1973 | Hinks | 340/146.3 R |
| 3,842,245 | 10/1974 | Schneiderhan | 235/61.1 |
| 3,891,492 | 6/1975 | Watson | 235/61.12 R |
| 3,891,830 | 6/1975 | Goldman | 235/61.7 B |

Primary Examiner—Daryl W. Cook
Assistant Examiner—Robert M. Kilgore
Attorney, Agent, or Firm—F. W. Brunner; L. A. Germain

[57] ABSTRACT

Magnetically encodable tags in tape format are written sequentially with tire identifying data and applied to the sidewall material of a green tire. The encoded data may be read from the tire at any point in the tire manufacturing process and the signals indicative of the tire identification number converted to an alphanumeric display and/or fed to a process control computer for on-line quality assurance and control or stored as a recorded history of the tire manufacturing process for inventory control.

8 Claims, 6 Drawing Figures

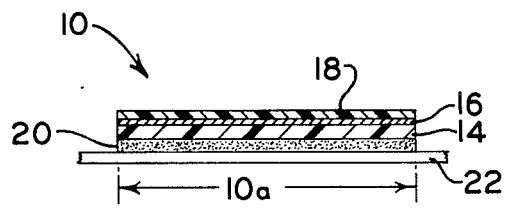
FIG-1
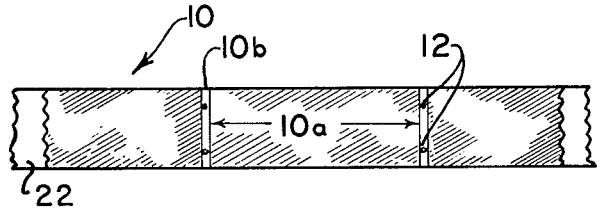
FIG-2
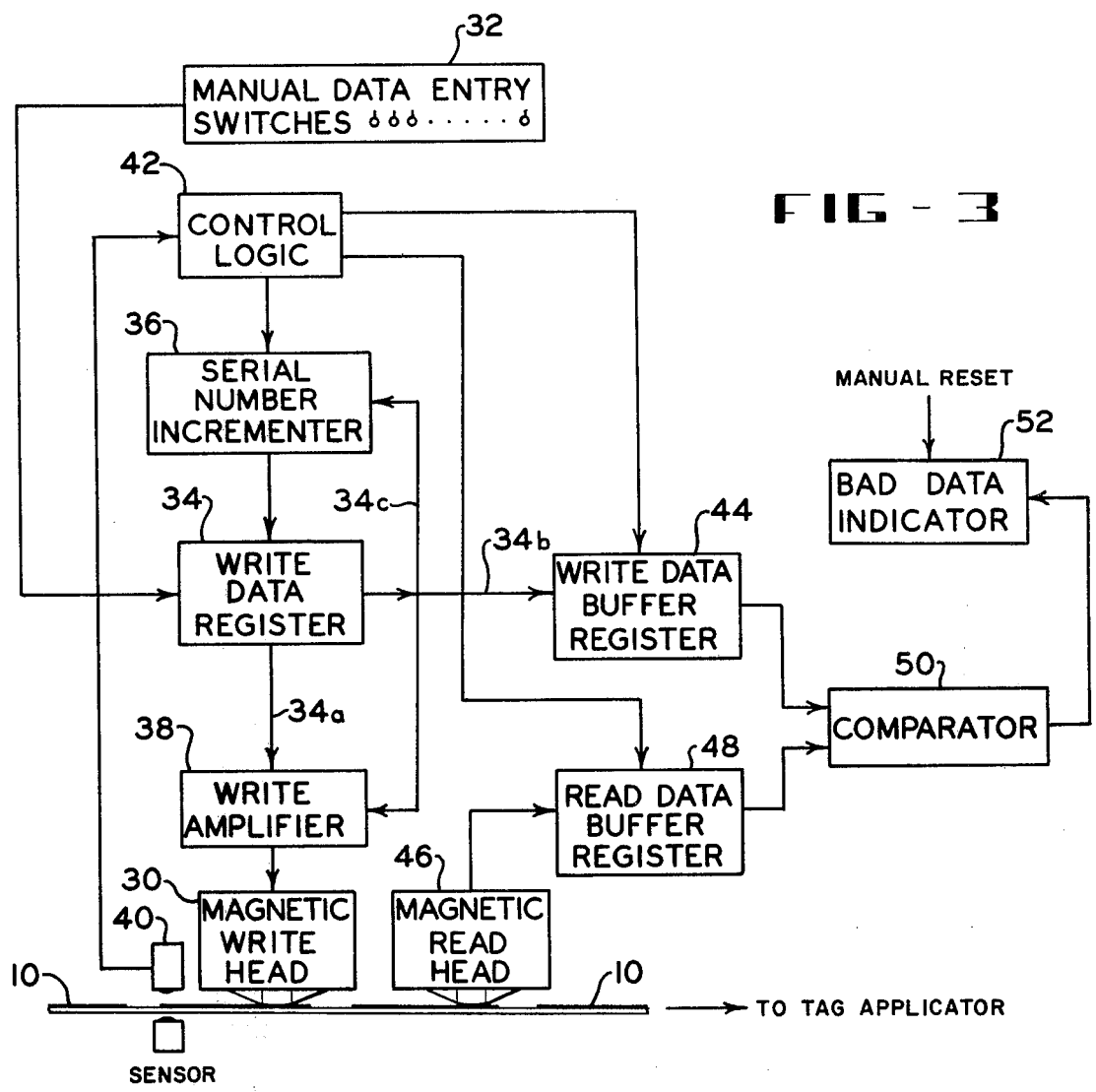
FIG-3
FIG-4
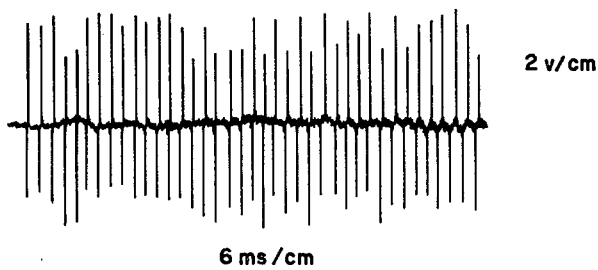

4,010,354

METHOD AND APPARATUS FOR TIRE IDENTIFICATION

BACKGROUND OF THE INVENTION

This invention relates generally to vehicle tire identification. More particularly, the invention provides a method and apparatus for encoding tire identifying data on a specially prepared tire builder's tag, applying the tag to the sidewall of a green tire, and reading out such encoded data at various stages in the tire manufacturing process to facilitate product quality assurance and inventory control.

Many varied techniques have been applied to tire identification and the success, or lack thereof, is evidenced by the absence of a workable method in the art. For example, these prior techniques included (a) sensing and reading impression codes molded into the elastomer of the tire sidewall surface as exemplified in U.S. Pat. No. 3,810,159, (b) embedding discrete magnetic bits into the tire elastomer as taught in U.S. Pat. No. 3,225,810, (c) mixing magnetizable material in the rubber as in U.S. Pat. No. 3,750,120 and (d) magnetically encoding the tire bead wires as in U.S. Pat. No. 2,920,674. Obviously these techniques involve changes to an already complex manufacturing process while also increasing the cost of a highly competitive product.

In this respect, therefore, the present invention provides a method and apparatus for tire identification that least effects the tire manufacturing process and/or the quality characteristics of the product. This is accomplished in the provision of a specially prepared magnetically encodable tag to replace the presently used tire builder's tag. The encodable tags are supplied in a tape format and encoded sequentially with tire identifying data by magnetic write apparatus.

Upon being applied to the sidewall surface of a green tire the tag is read by magnetic read apparatus and the resultant signals, indicative of the tire identification data, are used to present a visual readout of the data and/or fed to a computer for manufacturing process quality assurance and inventory control.

DESCRIPTION OF THE DRAWINGS

The objects and advantages of the invention will be readily apparent from the following description when considered in conjunction with the drawings in which:

FIG. 1 is a greatly enlarged elevational view, in section, of a tire identification tag as may be applied to this invention;

FIG. 2 is a plan view of the tag tape showing a plurality of tags thereon;

FIG. 3 is a block diagram representation of the tag encoding apparatus;

FIG. 4 illustrates the signal read from a magnetically encoded tag;

DESCRIPTION OF THE INVENTION

Figure 5:
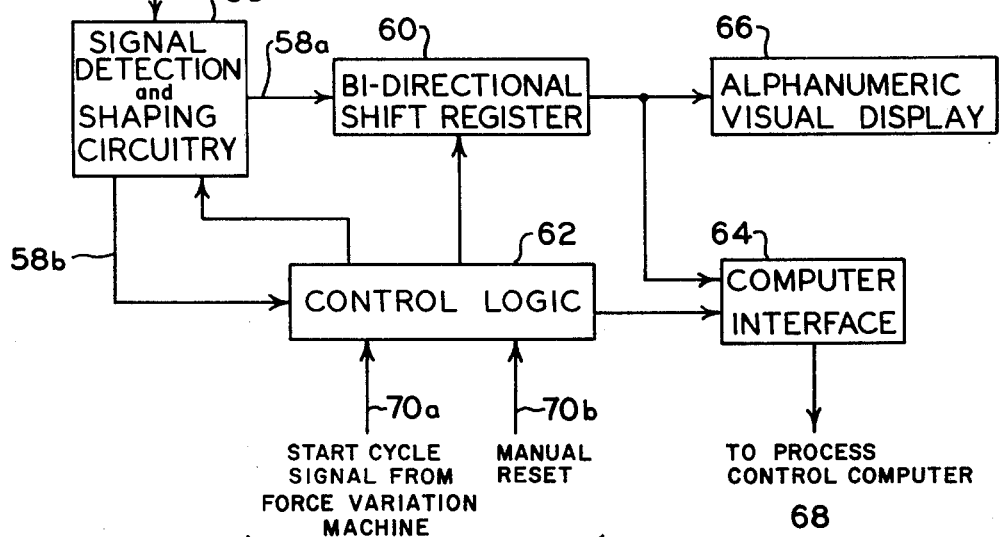
FIG. 5 is a block diagram representation of the tag reading apparatus.

Referring to FIGS. 1 and 2, a tire identification tag is generally indicated by reference number 10. The tag 10 is essentially one segment of a specially fabricated magnetic tape that is divided along its length into a plurality of sections 10a. The sections 10a are located such to facilitate encoding and separation of the tags as will be more fully understood as the description proceeds. The tag size is preselected for the bit data needed in a tire identification application and this may include such items as the tire builder's number, date of manufacture, manufacturer's identification number, and other indicia deemed necessary for proper tire identification. In this respect a tag length of 36 mm and width of 13 mm is sufficient to establish at least 42 data bits and provides a detectable bipolar signal as illustrated in FIG. 4. Naturally, larger or smaller tags may be made to carry more or less information respectively and the choice is not considered a limiting factor in the scope of this invention.

To proceed, the tag tape comprises a base ply 14 upon which is deposited a magnetically encodable material 16 of approximately 0.25 mm thickness. The thickness of the material 16 is determined by its capacity to produce uniform signals while withstanding the harsh environment found in a tire manufacturing facility. The base ply 14 may be any one of a number of suitable materials. A smooth paper or a plastic such as polyamide or polyester of approximately 0.075 mm thickness was found to maintain tag intergrity and signal uniformity throughout the tire building process. To protect the magnetic layer 16 from the deleterious effects of the environment, a coating 18, such as cellophane or other type film material, is applied over it and to mount the tag to the sidewall material of a green tire, an appropriate adhesive layer 20 is applied to the back surface of the base 14. A release liner 22 is applied to the exposed adhesive to complete the tape tag format.

Referring now to FIG. 3, the tag encoding apparatus is diagrammatically illustrated and comprises a magnetic write head 30 that encodes data bits into the magnetic coating of the tags 10 in a manner well known and understood in the art. However, because of the harsh environment found in a tire manufacturing facility, the tags are single track encoded, i.e., the data bits extend across the width of the tag. Bit selection is made by a panel of manual data entry switches 32 that establish the starting serial number. The bit data is loaded into a write data register 34 and each succeeding tag is incremented by one by a serial number incrementer 36. The bit data signal for each number is amplified in a write amplifier 38 that energizes the write head 30 for encoding the tags 10. In order to establish that the data bits are written within the tag length, a photo-electric sensor 40 is employed that is energized by the tape moving through its area of illumination. As illustrated in FIG. 2, energizing of the sensor at the proper moment may be done by holes 12 put in the tape at tag length intervals such that each tag may be identified when the illumination shines through the holes or else discrete tag lengths may be established on the tap by providing a space 10b therebetween such that the illumination through the release liner 22 is sufficient to trigger the sensor. Obviously other types of sensors may be employed, but in any case the sensor 40 sends a start signal to a control logic module 42 for establishing the proper tag encoding sequence.

For writing a tag, the control logic 42 shifts data out of the write data register 34 one bit at a time to the write amplifier 38 where it is strobed and applied to the write head 30. While a tag is being written the data is also circulated to a write data buffer register 44 via line 34b and to the serial number incrementer via line 34c. The write data buffer register 44 stores the data for a comparison with the data read from a tag by a magnetic read head 46 for a check of the enclodod number. To verify that each tag is properly encoded the read head 46 is mounted proximate to the write head 30 and the encoded data signal is picked up and read into a read data buffer register 48 that is also controlled by the logic 42. After the whole tag is read the contents of both write and read buffer registers 44 and 48 are compared in a comparator 50 to determine if they match. If the write data differs from the read data a bad data indicator 52 is energized to indicate the discrepancy. The indication may also be used to initiate either automatic or manual erase of the tape tags for rewriting in the proper sequence. Once the tags are encoded they may be stored on a tape reel or else the tag tape may be fed directly into a tag applicator device for mounting on the tire. In the application of tire identification for process control, the encoded tags will be applied to the sidewall material of a green tire at the tire building station. A tag applicator is mounted to the tire building machine such that tags may be applied automatically at a time determined by the tire builder. The tag applicator may be a pneumatically operated device that advances the tag tape from a storage spool of encoded tags or directly from the tag encoding apparatus with indexing of the tags controlled in a similar manner as described with respect to sensor 40. Many and various type label applicators are known and used in industry and it is deemed well within present knowledge and skill to apply these techniques to mounting of the tags.

The position of a tag on the tire sidewall must be established so that it may be read regardless of the size of the tire. To accomplish this, the tag applicator is mounted on the tire building machine so that all tags are applied a specific distance as measured from the tire bead. The tag reader is also designed to position the magnetic pickup head with respect to the bead and will thus pass over the tag regardless of the tire size. Portable hand held readers or force machine mounted readers have guides or rollers that follow the tire bead while the pickup head is swept over the tag. In either case and for any size tire the pickup is always positioned at a specific radial distance on the sidewall as measured from the tire bead. As previously mentioned, the tags are single track such that substantially the full width of 13 mm is bit encoded. Because of this a tag may be read even when its central axis is skewed or when the reader is not properly positioned with respect to the tire bead. Obviously the amount of allowable skew is determined by the tag width.

The tire identification read electronics illustrated in FIG. 5 reads and processes the magnetic tag signals. The read electronics comprises a magnetic pickup head 54 for sensing the encoded magnetic data on the tags 10 and a preamplifier 56 or increasing the signal amplitude and filtering undesired signal components picked up by the head 54. The amplified and filtered data signal is sent via line 56a to a signal detection and shaping circuit 58 that determines the direction that the pickup head 54 took when it traversed the encoded tag 10 and shifts the shaped data signal into a bi-directional shift register 60 via line 58a from the proper direction serially. The read electronics also includes a control logic module 62 that is forced into a data acquisition state by a start cycle signal 70 from a force variation machine 70a or manual reset 70b. The signal detection circuit 58 also counts the total number of ones and zeros in the data pattern and if the combined count does not equal the number written on the tag originally the data are considered invalid and the control logic 62 remains in the data acquisition state. However, if the data count is correct the control logic is advanced to a display state by reason of a signal on line 58b and generates signals required to format and transfer the data from the shift register 60 to a visual display 66 and a process control computer 68 via computer interface circuits 64. The data are transferred to the visual display 66 bit parallel-character serial while the data transferred to the computer 68 are bit serial-character serial. After the data are transferred to the display 66 and process control computer 68 the control logic 62 shifts to a wait state where it remains until the next start signal from a force machine 70a or manual reset 70b forces it to the data acquisition state to read the next tire.

Figure 6:
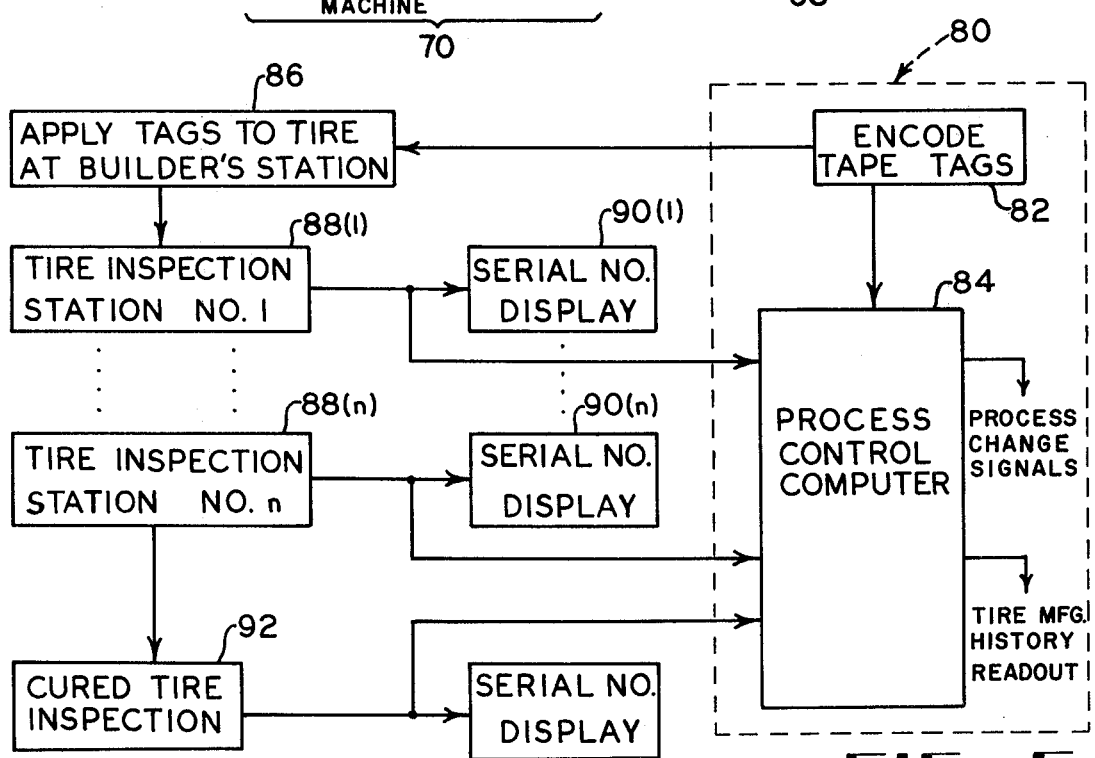
FIG. 6 illustrates the method of the invention as applied to tire manufacturing.

FIG. 6 illustrates the method of the invention as it is applied to a tire manufacturing facility. At a central control station 80 the tape tags are sequentially encoded at 82 with the desired tire identifying data and a process control computer 84 is fed the data and stores it for process and inventory control purposes. The tapes carrying the encoded tags are sent to the tire building stations 86 where a tag is applied to each green tire made. When a green tire leaves the tire building station various other operations may be done to it and these are monitored by inspection stations 88(l) to 88(n) that utilize tag readers and display devices 90(l) to 90(n) to identify the tires to personnel on the production line. At the same time the data is automatically fed into the process control computer 84 where a comparison is made with the original data entered when the tags were first encoded and an updated record is made for each tire. In this manner tires may be accurately and automatically routed, sorted and located within the facility and a record made of the tire manufacturing history. To complete the record history, tires checked on force variation equipment 92 are simultaneously monitored by readers mounted on the force machine and the cured tire inspection results for each tire made part of the tire manufacturing history by reason of the identification made and entered into the computer 84.

While certain representative embodiments and details have been shown for the purposes of illustrating the invention it will be apparent to those skilled in this art that various changes and modifications may be made therein without departing from the spirit or scope of the invention.

We claim:
1. In a tire manufacturing process, apparatus for identifying tires at various locations within the process comprising in combination:
A. a magnetically encodable tape comprising a plurality of identifiably discrete tags for recording data thereon;
B. means to encode the tape tags with binary data indicative of tire identifying information comprising a magnetic write head, sensor means in proximate position to the write head adapted to being energized by a tag, means to transport the tape past the sensor means and the write head to position the tags for encoding binary data thereon, a write data register, means to enter binary data into the write data register, an amplifier interconnecting the write data register and the write head to provide signals to strobe the write head, a control logic circuit responsive to the energization of the sensor means by a tape tag and connected to the write data register to shift data out of the register one bit at a time to the amplifier and thus to the write head such that a tag is binary encoded with the tire identifying data;

C. means accepting the encoded tape to apply a tag from the tape to the sidewall surface of a tire at a specific radial distance as measured from the tire bead; and D. means located at various process control locations for sensing and decoding the tag data on a tire to provide both a visual alpha-numeric display of the tire identification data and proper signal format to a computer for process and inventory control, said means comprising a magnetic pick-up head, means to effect relative motion between the tag on a tire sidewall and the pick-up head, a bi-directional shift register, signal detection and shaping means intercoupling the pick-up head and the shift register to determine the direction of relative motion to provide a shaped data signal serially to the bi-directional shift register, logic control means intercoupling the signal shaping means and the shift register and receiving a cycle start signal from the means effecting relative motion such that the logic transfers the data out of the shift register, and means coupled to and accepting the output data from the shift register to provide an alphanumeric visual display of the data.

2. Apparatus as set forth in claim 1 wherein the means to encode further comprises a serial number incrementer interconnecting the control logic circuit and the write data register to increment by one the binary data applied to each successive tag.

3. Apparatus as set forth in claim 1 wherein the means to encode further comprises:

A. a magnetic read head positioned downstream from the write head to read the binary data encoded on the tags;

B. a read data buffer register coupled to the read head and control logic to receive the data from the read head and store it according to a signal from the control logic;

C. a write data buffer register coupled to the write data register and the control logic to receive the data to be applied to a tag and store it according to a signal from the control logic;

D. a comparator coupled to receive the stored data from the write data buffer register and the read data buffer register to compare the data and provide a signal indicative of the comparison; and E. means coupled and responsive to the comparison signal from the comparator to provide an indication of a mismatch between the write and read data for a particular tag so that tags may be rewritten when a mismatch occurs.

4. Apparatus as set forth in claim 1 wherein the tape tags are single track encoded, a data bit occupying substantially the width of a tape tag.

5. Apparatus as set forth in claim 1 wherein the signal detection and shaping means comprises means to count the number of binary bits in the data signal to compare the count with the original number encoded to maintain the logic in a data acquisition mode if the count differs from the original count and to shift the logic to a display mode for shifting the data out of the bi-directional shift register when the bit count correctly matches the original count.

6. Apparatus as set forth in claim 1 further comprising a process control computer and a computer interface circuit, the interface circuit coupled to the bi-directional shift register output to receive the data indicative of a tire identification number and also coupled to the control logic such that the data is transferred into the computer for process and inventory control purposes.

7. A method of identifying vehicle tires for manufacturing process and inventory control comprising the steps of:

A. providing a plurality of magnetically encodable tags in a tape format having an adhesive backing suitable for application to the elastomer of a vehicle tire;

B. successively encoding the tags with binary data indicative of tire identification indicia;

C. applying a tag from the tape to the sidewall material of a green tire at the tire building station at a specific radial position with reference to the tire bead;

D. detecting and reading the magnetically encoded tag data at various control points in the tire manufacturing process;

E. converting the data to an alphanumeric display of the tire identification number at each control station; and F. communicating the detected tag data to a process control computer for each control point to provide a complete process history for each manufactured tire.

8. The method as set forth in claim 7 wherein the tags are single track encoded, the substantial width of the tape utilized for encoding a binary bit of information.

* * * * *